(12) United States Patent
Kohl et al.

(10) Patent No.: US 8,513,352 B2
(45) Date of Patent: Aug. 20, 2013

(54) CURABLE COMPOSITIONS HAVING IMPROVED FIRE PROPERTIES

(75) Inventors: Matthias Kohl, Weinheim (DE); Andreas Bolte, Solingen (DE); Nick Spielkamp, Essen (DE); Manfred Pröbster, Nußloch (DE); Deniz Yilmazoglu, Sandhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/558,507

(22) Filed: Jul. 26, 2012

(65) Prior Publication Data
US 2012/0329942 A1    Dec. 27, 2012

Related U.S. Application Data

(63) Continuation of application No. PCT/EP2011/050942, filed on Jan. 25, 2011.

(30) Foreign Application Priority Data

Feb. 4, 2010   (DE) .......................... 10 2010 001 588

(51) Int. Cl.
*C08G 77/04*    (2006.01)
*C09D 183/04*   (2006.01)
*C08L 83/04*    (2006.01)
*C09K 21/00*    (2006.01)

(52) U.S. Cl.
USPC ........................... 524/588; 525/478; 252/601

(58) Field of Classification Search
None
See application file for complete search history.

(56) References Cited

U.S. PATENT DOCUMENTS

| | | | |
|---|---|---|---|
| 3,441,534 A * | 4/1969 | Knaub | 524/860 |
| 4,910,255 A * | 3/1990 | Wakabayashi et al. | 525/100 |
| 5,399,607 A | 3/1995 | Nanbu et al. | |
| 7,541,405 B2 | 6/2009 | Gottschalk-Gaudig et al. | |
| 2004/0204539 A1 | 10/2004 | Schindler et al. | |
| 2004/0236056 A1* | 11/2004 | Schindler et al. | 528/38 |
| 2008/0312369 A1 | 12/2008 | Beers et al. | |

FOREIGN PATENT DOCUMENTS

| | | |
|---|---|---|
| EP | 0520426 | 4/1996 |
| EP | 0839853 | 5/1998 |
| EP | 1000979 | 5/2000 |
| EP | 1041101 | 10/2000 |
| EP | 1526153 | 4/2005 |
| WO | 2006128015 | 11/2006 |
| WO | 2007048538 | 5/2007 |

OTHER PUBLICATIONS

International Search Report issued in connection with International Patent Application No. PCT/EP2011/050942 mailed on Mar. 29, 2011.
DIN 53018, 1976.
DIN EN 27389, 1991.
DIN EN 28339, 1991.
Data Sheet Terostat MS 939FR, 2004.

* cited by examiner

*Primary Examiner* — Robert S Loewe
(74) *Attorney, Agent, or Firm* — Steven C. Bauman

(57) ABSTRACT

The invention relates to curable compositions comprising a) at least one organic polymer selected from polyethers and polyacrylic acid esters, wherein the organic polymer has at least one defined, cross-linkable end group having at least one $C_1$-$C_8$-alkoxy- or $C_1$-$C_8$-acyloxy radical, b) at least one poly(dialkylsiloxane) having at least one defined, cross-linkable end group having at least one vinyl radical and likewise at least one $C_1$-$C_8$-alkoxy- or $C_1$-$C_8$-acyloxy radical and c) at least one flame-retarding additive selected from red phosphorus, organic phosphor compounds, ammonia polyphosphate, metal hydroxides, expandable graphite, zinc borate and melamine salts, to the use of such compositions as adhesive, sealing or coating material, in particular for providing a substrate having a flame-retardant, elastic coating, to a coating thus obtained and to the use of at least one poly(dialkylsiloxane) b) to improve the fire properties of a curable composition comprising at least one organic polymer a).

13 Claims, No Drawings

CURABLE COMPOSITIONS HAVING IMPROVED FIRE PROPERTIES

The invention relates to curable compositions with improved fire properties, based on a mixture of silane-modified polyethers or polyacrylic acid esters and at least one special poly(dialkylsiloxane). The invention further relates to the use of such compositions as an adhesive, sealant or coating material, in particular for providing a substrate with a flame retardant, elastic coating, to a coating obtained in this manner, as well as the use of the special poly(dialkylsiloxane) for improving the fire behavior of a curable composition based on the cited silane-modified polyether or polyacrylic acid ester.

For many years one- and two-component moisture curing adhesives, sealants and coating materials have played a major role in numerous technical applications. In addition to the polyurethane adhesives and sealants with free isocyanate groups, and the traditional silicone adhesives and sealants based on poly(dimethylsiloxanes), in recent years the so-called silane-modified adhesives and sealants have also been increasingly used. Compared with the polyurethane adhesives and sealants, the silane-modified adhesives and sealants have the advantage that they are free of isocyanate groups, in particular of monomeric isocyanate groups. Furthermore, they are characterized by a broad adhesion spectrum to a great number of substrates without the need for surface treatment with primers. Compared to traditional silicone adhesives and sealants based on dimethylpolysiloxanes, the silane-modified adhesives and sealants exhibit a significantly better adhesion behaviour towards a great number of substrates. In addition, the traditional silicone adhesives and sealants, in contrast to silane-modified adhesives and sealants, cannot be painted over and stain more easily. Silane-modified adhesives, sealants and coating materials are therefore the system of choice in many applications.

In this regard, the requirements placed on the adhesives, sealants and coating materials are many and varied and differ according to the application. Of course, the adhesives, sealants and coating materials must firstly fulfill their primary purpose, i.e. reliably adhere, seal or form well adhering and resistant coatings. Other factors also play a major role, however, such as being able to be painted over, long term stability or behavior under thermal stress, for example in the case of a fire. The last is in particular of decisive significance if the adhesives, sealants and coating materials are intended to be used in building construction, automobile construction or plant construction, particularly if the plants are used for the treatment or transport of highly inflammable or even explosive substances, as is often the case for example in the chemical or oil-refining industries.

Various adhesives, sealants and coating materials based on silane-modified polymers have already been developed and successfully employed in such applications. They are used for example for the elastic coating and adhesion of tube and boiler installations and for coating insulating materials that themselves are used in the construction of corresponding plant. In general, the products are based on silane-modified polyethers or polyacrylic acid esters. Large amounts of flame retardant additives are blended in in order to achieve fire protection characteristics. As a result of the constantly increasing demands for fire resistance of the materials used in certain fields, it is required to improve still further the fire behavior of the adhesive, sealant and coating materials.

EP 0 839 853 A1 proposes sprayable silicone emulsions, based on a reaction product of classical silicones with an aminoxy-functional siloxane or silane, for use in the construction industry. The emulsion additionally comprises water, surfactant and a special filler. As this is a system based on dimethylpolysiloxanes, it exhibits the already abovementioned disadvantages associated with the silicone adhesives and sealants.

In particular, the adhesion to a series of materials is inadequate.

Fast curing one-component mixtures that comprise alkoxysilane-terminated polymers are known from US 2004/0204539 A1. In this regard, the polymers that come into consideration are those with an organic backbone, and also those whose polymeric backbone is wholly or at least partly formed from an organosiloxane. It was pointed out in general terms that mixtures of polymers with different main chains could be employed, although a practical disclosure of a mixture that comprises a polymer with an organic backbone and a polymer based on organosiloxane was not to be found. The described mixtures apparently cure rapidly; the fire behavior was not mentioned. Accordingly, the addition of a flame retardant additive was also only mentioned in passing when listing a great number of possible additional adjuvants.

The subject matter of WO 2007/048538 A1 is α-ethoxysilane-modified polymers that release less methanol on curing and which exhibit an acceptable cure rate. Besides a great number of the most different organic polymers, silicone resins were also cited as a possible polymer basis. Here as well, no disclosure was made on mixtures of polymers, in which one polymer possesses an organic backbone and a second polymer is based on organosiloxane. Once again the fire performance was not alluded to. Only in the context of a listing of optional additives was the addition of various flame retardants mentioned.

Accordingly, the object of the invention was to provide a crosslinkable composition that forms the basis for an adhesive, sealant and coating material, based on a silane-modified organic polymer, which can be formulated as a one-, two- or multi-component type, and which shows good fire resistance.

The benefits of known adhesives, sealants and coating materials based on silane-modified polymers, such as good brushability and good application behavior, good adhesion on many substrates, as well as high elasticity, high tensile strength, good abradability and weatherability of the cured preparation should of course be retained. In addition, where possible the use of halogenated or antimony-containing substances should be avoided.

It was surprisingly found that the object is achieved by employing special poly(dialkylsiloxanes) in curable compositions based on certain silane-modified polyethers or polyacrylic acid esters.

A subject matter of the invention is accordingly a curable composition, comprising a) at least one organic polymer, selected from polyethers and polyacrylic acid esters, wherein the organic polymer possesses at least one end group of the general Formula (I)

$$-A_n-R-SiXYZ \qquad (I)$$

in which

A stands for a divalent linking group, selected from the amide, carbamate, urea, imino, carboxylate, carbamoyl, amidino, carbonate, sulfonate and sulfinate group and from the oxygen atom and nitrogen atom, R is a divalent hydrocarbon group with 1 to 12 carbon atoms whose main hydrocarbon chain can optionally be interrupted by a hetero atom, and X, Y, Z independently of one other are $C_1$-$C_8$ alkyl, $C_1$-$C_8$ alkoxy or $C_1$-$C_8$ acyloxy groups, wherein at least one of the groups is a $C_1$-$C_8$ alkoxy or $C_1$-$C_8$ acyloxy group, and n is 0 or 1, b) at least one poly(dialkylsiloxane) with at least one end group of the general Formula (I')

$-A'_n\text{-}R'\text{—}SiX'Y'Z'$ (I'), in which

A' stands for a divalent linking group, selected from the amide, carbamate, urea, imino, carboxylate, carbamoyl, amidino, carbonate, sulfonate and sulfinate group and from the oxygen atom and nitrogen atom, R' is a direct bond or a divalent hydrocarbon group with 1 to 12 carbon atoms whose main hydrocarbon chain can optionally be interrupted by a hetero atom, and X', Y', Z' independently of one other are vinyl groups, $C_1$-$C_8$ alkoxy or $C_1$-$C_8$ acyloxy groups, wherein at least one of the groups is a vinyl group and at least one of the groups is a $C_1$-$C_8$ alkoxy or $C_1$-$C_8$ acyloxy group, and n' is 0 or 1, and c) at least one flame retardant additive, selected from red phosphorus, organic phosphorous compounds, ammonium polyphosphate, metal hydroxides, expandable graphite, zinc borate and melamine salts.

This type of composition shows excellent adhesion properties to a wide variety of substrates, enables by the very good extensibility after curing highly elastic adhesive bonds and coatings, and is particularly characterized by an excellent fire performance.

In this regard, an excellent fire performance is understood to mean that the curable compositions and the cured products resulting therefrom are poorly inflammable and possess self-extinguishing properties. In particular, this is understood to mean that the curable compositions and the cured products resulting therefrom only ignite at higher temperatures and/or longer exposure to a flame and/or after exposure to a flame up to ignition and subsequent removal of the flame they extinguish themselves more rapidly than a curable composition that differs from an inventive composition by substituting the poly(dialkylsiloxane) b) by another organic polymer a).

Besides the noticeable improvement of the fire performance, it is also surprising that the uncured mixtures do not have any stability problems in storage. It is well known, that many classical silicone polymers are not compatible with silane-modified polymers, and mixtures of these components often separate/de-mix in the cartridge or in other storage containers. The miscibility with accelerator pastes, such as those used in two-component formulated adhesives, sealants and coating materials based on silane-modified polymers, is perfect.

A curable composition is understood to mean a substance or a mixture of a plurality of substances, which is curable by physical or chemical means. In this regard, these physical or chemical means can consist for example in the supply of energy in the form of heat, light or other electromagnetic radiation, but also most simply by contact with moisture of the air, with water or another reactive component.

A polyether is understood to mean a polymer, whose organic repeat units comprise ether functionalities C—O—C in the main chain. Accordingly, the polyethers do not include polymers having pendent ether groups such as the cellulose ethers, starch ethers and vinyl ether polymers. In general, polyacetals such as polyoxymethylene (POM) are likewise not counted as polyethers.

A polyacrylic acid ester is understood to mean a polymer based on acrylic acid esters and/or methacrylic acid esters which therefore has the structural moiety —$CH_2$—$CR^1$($COOR^2$)— as the repeat unit, wherein $R^1$ stands for H or methyl and $R^2$ for linear, branched, cyclic and/or even functionally substituted alkyl groups. $R^1$ is preferably H. $R^2$ preferably stands for an optionally substituted $C_1$-$C_{10}$ alkyl, particularly preferably for an optionally substituted $C_1$-$C_4$ alkyl and quite particularly preferably for methyl, ethyl, isopropyl, n-butyl, isobutyl, tent-butyl, cyclohexyl, 2-ethylhexyl or 2-hydroxyethyl.

The inventive curable composition comprises at least one organic polymer, selected from polyethers and polyacrylic acid esters, wherein the organic polymer possesses at least one end group of the general Formula (I)

$-A_n\text{-}R\text{—}SiXYZ$ (I)

wherein A, R, X, Y, Z and n have the above cited meanings. These organic polymers are hereinafter also designated as the component a) or the organic polymer a).

In this regard, a divalent linking unit A is understood to mean a divalent chemical group that links the polymer backbone with the R group of the end group. The divalent linking group A can be formed for example during the production of the alkoxy and/or acyloxysilane-terminated polyether and/or polyacrylic acid ester polymer, for example as a urethane group (carbamate group) by means of the reaction of a hydroxyl group-functionalized polyether with an isocyanate silane. In this regard, the divalent linking group can be both distinguishable as well as non-distinguishable from the resulting structural features of the basic polymer backbone. A non-distinguishable structural feature occurs for example when it is identical with the points of attachment of the repeat units of the polymer backbone.

In Formula (I) n stands for 0 or 1, i.e. the divalent linking group A links the polymer backbone to the group R (n=1) or the polymer backbone is bonded or linked directly to the group R (n=0).

The R group is a divalent $C_1$-$C_{12}$ hydrocarbon group that optionally comprises a heteroatom in the hydrocarbon main chain. Oxygen (O) or nitrogen (N) for example can be comprised as the heteroatom. The hydrocarbon group can be a straight chain or branched or cyclic, substituted or un-substituted alkylene group, for example. The hydrocarbon group can be saturated or unsaturated.

X, Y and Z independently of one another are $C_1$-$C_8$ alkyl groups, $C_1$-$C_8$ alkoxy groups or $C_1$-$C_8$ acyloxy groups. Here at least one of the X, Y, Z groups must be a hydrolysable group, that means a $C_1$-$C_8$ alkoxy group or a $C_1$-$C_8$ acyloxy group. Alkoxy groups, especially methoxy, ethoxy, propoxy and butoxy groups, are preferably selected as the hydrolysable groups. This is advantageous, as no substances that irritate the mucous membranes are released on curing the alkoxy group-containing compositions. In the released amounts, the alcohols that are formed are harmless and evaporate. Consequently, compositions of this type are particularly suitable for the do-it-yourself sector. However, acyloxy groups, such as an acetoxy group —O—CO—$CH_3$, can also be used as the hydrolysable groups.

Preferably, one of the X, Y, Z groups is an alkyl group and the remaining two groups each stand for an alkoxy group, or all three X, Y, Z groups each stand for an alkoxy group. In general, polymers that comprise di or trialkoxysilyl groups have highly reactive linking sites that enable a rapid curing, high degrees of crosslinking and thereby a good final strength. The particular advantage of dialkoxysilyl groups is that after curing, the corresponding compositions are more elastic, softer and more flexible than the systems that comprise trialkoxysilyl groups. Consequently, they are particularly suitable for an application as a sealant. Moreover, on curing, they split off even less alcohol and are therefore of particular interest when the amount of released alcohol should be reduced. With trialkoxysilyl groups on the other hand, a higher crosslinking degree can be achieved which is particularly advantageous when a more highly cured, stronger compound is desired after curing. Moreover, trialkoxysilyl groups are more reactive, thus crosslink faster and thereby lower the optionally required amount of catalyst, and they exhibit advantages for "cold flow"—dimensional stability of a corresponding adhesive under the influence of force and optionally temperature.

Particularly preferred X, Y and Z independently of each other are a methyl, an ethyl, a methoxy or an ethoxy group. X, Y and Z independently of each other are particularly preferably a methyl or a methoxy group. Methoxy and ethoxy groups are comparatively small hydrolysable groups with low steric hindrance, are very reactive and thereby allow a rapid cure even with low levels of catalyst. Consequently, they are of particular interest for systems, in which a rapid cure is desired, such as for example for adhesives that should exhibit a high initial adhesion. Depending on the nature of the alkyl group on the oxygen atom, compounds that contain alkoxysilyl groups possess different reactivities in chemical reactions. In this regard, the methoxy group shows the highest reactivity among the alkoxy groups. Recourse can also be made to such silyl groups when a particularly fast cure is desired. In comparison with methoxy groups, higher aliphatic groups such as ethoxy cause an already lower reactivity of the terminal alkoxysilyl groups and can be advantageously employed for the development of graduated crosslinking rates.

Combinations of both groups open up interesting design possibilities. If for example methoxy and ethoxy are respectively selected for X and Y within the same alkoxysilyl group, then the desired reactivity of the final silyl groups can be particularly finely tuned, in the case that silyl groups with exclusively methoxy groups are found to be too reactive and the silyl groups carrying ethoxy groups too sluggish for the required application.

Besides methoxy and ethoxy groups, larger groups that have an inherently lower reactivity can of course also be employed as the hydrolysable groups This is then of particular interest when a reduced cure rate is intended as a result of the design of the alkoxy groups.

However, the curable compositions according to the invention preferably comprise at least one organic polymer a) with at least one end group of the general Formula (I), wherein X, Y and Z each independently of one another stand for methyl, ethyl, methoxy or ethoxy, with the proviso that at least two of the X, Y and Z groups stand for methoxy or ethoxy. An organic polymer a) with at least one end group of the general Formula (I) is particularly preferred, wherein X, Y and Z stand for methoxy.

R is preferably a hydrocarbon group with 1 to 6 carbon atoms. The cure rate of the composition can also be influenced by the length of the hydrocarbon groups that form the linking group between polymer backbone and silyl group. In particular, R is a methylene, ethylene or 1,3-propylene group. Methylene and 1,3-propylene groups are particularly preferably employed. Alkoxysilane-terminated compounds with a methylene group as the linking group to the polymer backbone-so called α-silanes—exhibit a particularly high reactivity of the terminal silyl group; this leads to shorter setting times and thereby to a very rapid cure of formulations based on such polymers.

In general, an increase in length of the linking hydrocarbon chain leads to a decreased reactivity of the polymer. In particular, the γ-silanes—they comprise the unbranched propylene group as the linker—exhibit a balanced relationship between necessary reactivity (acceptable cure times) and delayed curing (open time, possibility for correction after successful adhesion). The rate of cure of the systems can be influenced as required by means of an intentional combination of α and γ-alkoxysilane-terminated building blocks.

Consequently, the inventive curable compositions preferably comprise at least one organic polymer a) with at least one end group of the general Formula (I), wherein R stands for a methylene or 1,3-propylene group.

A is inventively an amide, carbamate, urea, imino, carboxylate, carbamoyl, amidino, carbonate, sulfonate or sulfinate group or an oxygen or nitrogen atom. The connecting unit A can be formed during the production of the silyl-terminated polymer, in that the backbone polymer is treated with a reactive compound that carries the —R—SiXYZ sequence. The A group can be both distinguishable as well as non-distinguishable from the resulting structural features in the basic polymer backbone. A non-distinguishable structural feature occurs for example when it is identical with the points of attachment of the repeat units of the polymer backbone. In this case, n would correspond to the value 0. When the linking group A is distinguishable from the linking groups in the polymer backbone, then n corresponds to the value 1.

Carbamate (urethane) and urea groups are particularly preferred linking groups; they can be obtained by treating certain functional groups of a prepolymer with an organosilane that carries another functional group. Carbamate groups can result for example when either the polymer backbone comprises terminal hydroxyl groups and isocyanato silanes, are added as the additional component, or conversely when a polymer that has terminal isocyanate groups is treated with an alkoxysilane that comprises terminal hydroxyl groups (hydroxyl-functional alkoxysilane). In the same way, urea groups can be obtained when a terminal primary or secondary amino group—either on the silane or on the polyether and/or polyacrylic acid ester—is added and which reacts with a terminal isocyanate group that is present in the respective reaction partner. This means that either an amino silane is reacted with a polyether and/or polyacrylic acid ester carrying a terminal isocyanate group, or a polyether and/or polyacrylic acid ester carrying a terminal amino group is/are reacted with an isocyanate silane.

Carbamate and urea groups advantageously increase the tensile strength of the polymer chains and of the crosslinked polymer as a whole, because they can form hydrogen bonds.

Polymers that comprise polyether as the backbone have a flexible and elastic structure not only on the end groups but also in the polymer backbone. In this way compositions can be produced that possess excellent elastic properties.

In this regard, polyethers are not only flexible in their backbone but also resistant at the same time. Thus for example they are neither attacked nor decomposed by water and bacteria. In the context of the present invention, polyethers that are based on polyethylene oxide and/or polypropylene oxide are particularly preferably employed in the component a) due to considerations of availability.

In the context of their use in inventive compositions, polymers that comprise polyacrylic acid ester as the backbone exercise a particularly advantageous effect on the fire performance of the composition. Corresponding polyacrylic acid $C_1$-$C_4$ esters are preferred; polyacrylic acid esters that are obtained by polymerizing acrylic acid methyl ester and acrylic acid butyl ester are particularly preferred.

Consequently, polyethers, selected from polyethylene glycols, polypropylene glycols and ethylene glycol-propylene glycol copolymers, or polyacrylic acid $C_1$-$C_4$ esters are preferably employed as the organic polymer a) in inventive curable compositions. The inventive curable composition particularly preferably comprises a polypropylene glycol with at least one end group of the general Formula (I) as the organic polymer a).

The organic polymer(s) a) preferably possess(es) at least two end groups of the general Formula (I). Each polymer chain thus comprises at least two linking sites, at which the polymers can undergo condensation through cleavage of the hydrolysed groups in the presence of atmospheric humidity. In this manner a uniform and rapid crosslinkability is achieved, such that adhesive bondings can be obtained with a good strength. Moreover, the amount and the structure of the hydrolysable groups—e.g. the use of dialkoxysilyl or trialkoxysilyl groups, methoxy groups or longer substituents etc.—allow the physical form of the achievable network to be steered towards a long chain system (thermoplastics), a relatively loosely crosslinked three-dimensional network (elastomers) or a highly crosslinked system (thermosets), such that inter alia the elasticity, the flexibility and the heat resistance of the finished crosslinked compositions can thereby be influenced.

The component a) preferably comprises at least one alkoxysilane- and/or acyloxysilane-terminated polyether, which has a molecular weight $M_n$ of 4 000 to 100 000 g/mol, preferably 8 000 to 50 000 g/mol, particularly preferably 10 000 to 30 000 g/mol, in particular 15 000 to 25 000 g/mol. The molecular weight $M_n$, is understood to mean the number average molecular weight of the polymer. In the context of the present invention, the number average molecular weight $M_n$ and the weight average molecular weight $M_w$ are determined by gel permeation chromatography (GPC). This type of process is known to the person skilled in the art. The molecular weights given above are particularly advantageous as the corresponding compositions possess a balanced relationship between viscosity (ease of processing), strength and elasticity. This combination is very advantageously pronounced in a molecular weight range ($M_n$) of 12 000 to 20 000 g/mol, in particular from 14 000 to 18 000 g/mol.

In the context of the present invention, the component a) preferably comprises at least one polyether, whose ratio $M_w/M_n$ is less than 1.5. The ratio $M_w/M_n$, which is also referred to as the polydispersity, signifies the molecular mass distribution and thereby the different polymerization degrees of the individual chains in polydisperse polymers. The polydispersity has a value of about 2 for many polymers and polycondensates. A value of 1 signifies a strict monodispersity. In the context of the present invention, the preferred polydispersity of less than 1.5 indicates a comparatively narrow molecular weight distribution and thereby indicates the specific development of properties associated with the molecular weight, such as e.g. the viscosity.

The polyether(s) that are preferably employed in the component a) is/are preferably further characterized by a low number of double bonds at the polymer chain ends. This so-called terminal unsaturation results from an unwanted side reaction in the polymerization of low molecular weight diols with alkylene oxides. As a result, a certain fraction of monohydroxypolyethers is present that can be silylated only at one chain end and accordingly crosslink only through one chain end. This has adverse effects on the functionality of the polyether and on the compositions produced from them. Polyethers with a low number of terminal double bonds can be manufactured for example by the so-called Double Metal Cyanide Catalysis (DMC catalysis).

The inventive curable compositions further comprise at least one poly(dialkylsiloxane) with at least one end group of the general Formula (I')

$$-A'_{n'}R'-SiX'Y'Z' \qquad (I'),$$

in which A', R', X', Y', Z' and n' have the above cited meanings. These poly(dialkylsiloxanes) are hereinafter also designated as the component b) or poly(dialkylsiloxane) b).

In regard to the divalent linking unit A', the statements made above with respect to the divalent linking unit A apply analogously. Besides the carbamate and urea groups cited above as particularly preferred linking units, in addition oxygen atoms, however, are particularly preferred as the linking unit A'. The linking unit A' in Formula I' stands quite particularly preferably for an oxygen atom.

R' stands for a direct bond or a divalent C1-C12 hydrocarbon group that optionally comprises a hetero atom in the main chain of the hydrocarbon. Oxygen (O), nitrogen (N) or sulfur (S) for example can be comprised as the heteroatom. The hydrocarbon group can be a straight chain or branched or cyclic, substituted or un-substituted alkylene group, for example. The hydrocarbon group can be saturated or unsaturated. R' preferably stands for a direct bond or a $C_1$-$C_6$ hydrocarbon group. In particular, R' is a direct bond, a methylene, ethylene or 1,3-propylene group. R' particularly preferably stands for a direct bond, a methylene or 1,3-propylene group, quite particularly preferably for a direct bond.

Accordingly, poly(dialkylsiloxanes) with at least one end group of the general Formula (I'), wherein A' stands for —O— and R' for a direct bond, are preferred as the component b).

X', Y', Z' in Formula (I'), independently of one other, stand for vinyl groups, $C_1$-$C_8$ alkoxy or $C_1$-$C_8$ acyloxy groups, wherein at least one of the groups is a vinyl group and at least one of the groups is a $C_1$-$C_8$ alkoxy or $C_1$-$C_8$ acyloxy group.

This substitution pattern ensures in particular that the poly(dialkylsiloxane) b) is compatible with the organic polymer a) and that no stability problems arise during storage of a composition that comprises both polymers.

One of the groups X', Y' and Z' preferably stands for a vinyl group and the remaining two groups each stand for a $C_1$-$C_8$ alkoxy group.

In this regard, preferred $C_1$-$C_8$ groups are the methoxy and ethoxy groups, particularly preferably the methoxy group.

Preferred components b) are therefore poly(dialkylsiloxanes) with at least one end group of the general Formula (I'), wherein X' stands for vinyl and Y' and Z' independently of one another stand for methoxy or ethoxy.

The inventive curable compositions particularly preferably comprise at least one poly(dialkylsiloxane) with at least one end group of the general Formula (I'), wherein A' stands for —O—, R' for a direct bond, n' for 1, X' stands for vinyl and Y' and Z' independently of one another stand for methoxy or ethoxy, particularly methoxy.

The alkyl groups of the polymer backbone of the poly(dialkylsiloxanes) b) can for example be a straight chain or branched or cyclic $C_1$-$C_{20}$ alkyl. Preferred alkyl groups are methyl, ethyl, n-propyl and cyclohexyl. Methyl is particularly preferred. Preferably, the poly(dialkylsiloxane) b) is therefore a poly(dimethyl)siloxane).

Poly(dialkylsiloxanes) that are quite particularly preferred as the component b) have the general Formula (II),

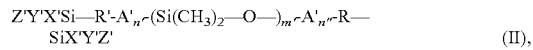

$$Z'Y'X'Si-R'-A'_{n'}-(Si(CH_3)_2-O-)_{m'}-A'_{n'}-R-SiX'Y'Z' \qquad (II),$$

in which
A' stands for —O—,
R' stands for a direct bond,
X' stands for vinyl,
Y' and Z' independently of one another stand for methoxy or ethoxy, particularly methoxy,
n' stands for 1, n" stands for 0 and m' stands for a whole number from 2 to 5000, preferably 5 to 2500, more preferably 10 to 1000 and quite particularly preferably 50 to 500.

The inventive curable compositions comprise as the component c) at least one flame retardant additive, selected from red phosphorus, organic phosphorous compounds, ammonium polyphosphate, metal hydroxides, expandable graphite, zinc borate and melamine salts. These flame retardant additives are hereinafter also designated as the component c) or flame retardant additive c).

Preferred organic phosphorous compounds are triphenyl phosphate, tricresyl phosphate and halogenated phosphoric acid esters, wherein among the halogenated phosphoric acid esters themselves, trichloroethyl phosphate, tris(2-chloroethyl) phosphate, tris(2-chloroisopropyl) phosphate and tris(2,3-dibromopropyl) phosphate are preferred. Preferred metal hydroxides are aluminum hydroxide and magnesium hydroxide, preferred melamine salts melamine orthophosphate, dimelamine orthophosphate, dimelamine pyrophosphate, melamine polyphosphate and melamine borate.

Antimony oxide is optionally added as a synergist. This is particularly the case when halogenated phosphoric acid esters are used as the flame retardant additive.

In certain cases it is advantageous when the adhesives, sealants and coating agents that are employed are halogen-free and free of antimony-containing compounds. Accordingly, in a particular embodiment, the inventive curable compositions are halogen-free and free of antimony-containing compounds. In this case, the flame retardant additive is naturally also selected only from compounds that are halogen-free and antimony-free. In this regard, free of halogen compounds and antimony-containing compounds are understood to mean that the total amount of halogen- and antimony-containing compounds in the curable composition is at most 10 ppm, preferably at most 1 ppm, relative to the total weight of the curable composition.

The inventive curable compositions preferably comprise at least one flame retardant additive, selected from aluminum hydroxide, magnesium hydroxide, expandable graphite and zinc borate. Aluminum hydroxide is particularly preferably comprised as the flame retardant additive.

In the inventive curable compositions the weight ratio of the total amount of organic polymer a) to the total amount of poly(dialkylsiloxane) b) is preferably from 5:1 to 1:5, preferably from 3:1 to 1:3, particularly preferably from 2:1 to 1:2. If the curable composition comprises a plurality of organic polymers a) and/or a plurality of poly(dialkylsiloxanes) b), then the total amount is of course understood to mean the sum of the amounts of all representatives of a component, i.e. the sum of the amounts of all organic polymers a) and the sum of the amounts of all poly(dialkylsiloxanes) b).

The total amount of flame retardant additive c) is preferably at least 10 wt %, preferably at least 25 wt %, particularly preferably at least 50 wt %, each relative to the total weight of the curable composition. Once again, the total amount is understood to mean the sum of the amounts of all representatives of a component, in this case the component c).

Generally, the inventive compositions per se are already suitable as adhesives, sealants or coating materials. However, in addition to the above cited components a), b) and c) they can optionally further comprise additional auxiliaries and additives that confer for example improved elastic properties, improved resilience and low residual stickiness. These auxiliaries and additives include adhesion promoters, plasticizers and fillers. In addition, curing catalysts can be provided, such as for example organotin compounds that are usually used for curable compositions based on silane-modified polymers. Moreover, the compositions can comprise for example stabilizers, antioxidants, reactive diluents, drying agents, UV stabilizers, anti-aging agents, rheological auxiliaries, color pigments or color pastes, fungicides, flame retardants and/or optionally to a limited extent solvents as the additional additives.

The inventive compositions can be made up as one-component moisture-curable adhesive, sealant or coating compositions. This is particularly indicated for applications for edge sealing or for forming very narrow adhesive and sealant compounds, for this no components need to be mixed and the curing is ensured by diffusion of water vapor from the edge zone or from the environment with a sufficiently rapid cure. For adhesively bonding or coating large surfaces, in particular non-porous substrates, the person skilled in the art, however, prefers a two- or multi-component embodiment form, in order to make certain that the composition is adequately cured. Accordingly, the inventive compositions can also be in two- or multi-component form.

In the 2-component embodiment of the inventive curable composition, one of the ingredients a), b) and c) can be separated from the two others in different components, such that a curable composition that comprises the inventively provided ingredients a), b) and c) results only when the components have been mixed. However, an embodiment is preferred in which a first component (component A) already comprises the ingredients a), b) and c), thus being already a one-component inventive curable composition, and the second component (component B) is an accelerator component. The latter is also called a curing component. In this regard, a component B that comprises at least water and a thickener is preferred. The component B preferably comprises 1 to 20 wt %, preferably 3 to 15 wt % water, wherein this quantity refers to the total weight of the component B. Here, the water is preferably adsorbed on inorganic thickeners or dissolved or swollen in organic thickeners. In addition, the component B can comprise an oligomer, preferably a polypropylene glycol, polyethylene glycol or a copolymer of propylene oxide and ethylene oxide. Mixtures of various polyoxyalkylenes can also be employed. The molecular weights of the polyoxyalkylene(s) are preferably between 1000 and 20 000, preferably between 2000 and 12 000 g/mol.

Water-soluble or water-swellable polymers or inorganic thickeners are preferred thickeners for the preferred embodiment. Exemplary organic natural thickeners are agar agar, carrageen, traganth, gum Arabic, alginates, pectins, polyoses, guar meal, starch, dextrins, gelatins, casein. Exemplary organic totally or partially synthetic thickeners are carboxymethyl cellulose, cellulose ethers such as e.g. tylose, hydroxyethyl cellulose, hydroxypropyl cellulose, poly(meth) acrylic acid derivatives, polyvinyl ethers, polyvinyl alcohol, polyamides, polyimines. Exemplary inorganic thickeners or adsorbents for water are polysilicic acids, highly dispersed pyrogenic hydrophilic silicic acids, mineral clays such as montmorillonite, kaolinite, halloysite, aluminum hydroxide, aluminum oxide hydrate, aluminum silicates, talcum, quartz minerals, magnesium hydroxide or the like.

The component is preferably designed such that the component A is mixed with the component B prior to use in a ratio of 1:1 to 200:1 parts by weight, so as to ensure a rapid and complete cure.

In the two- or multi-component embodiment, both the component A as well as the component B can comprise the already cited additional usual auxiliaries and additives.

Thus, one or more plasticizers can be comprised. A plasticizer is understood to mean a substance that reduces the viscosity of a composition and thereby facilitates the processability and moreover improves the flexibility and elongation behavior of the composition.

The plasticizer(s) is/are preferably selected from a fatty acid ester, a dicarboxylic acid ester, an ester of a fatty acid carrying OH-groups or of an epoxidized fatty acid, a fat, an ester of glycolic acid, an ester of phthalic acid, an ester of benzoic acid, an ester of phosphoric acid, an ester of sulfonic acid, an ester of trimellitic acid, an epoxidized plasticizer, a polyether plasticizer, a polystyrene, a hydrocarbon plasticizer and a chlorinated paraffin, as well as mixtures of two or more thereof. By the judicious choice of one of these plasticizers or of one specific combination, additional advantageous properties of the inventive composition can be realized, e.g. gelling behavior of the polymer, cold temperature elasticity or cold temperature resistance or even antistatic properties.

Suitable examples from the group of the phthalic acid esters are dioctyl phthalate, dibutyl phthalate, diisoundecyl phthalate, diisononyl phthalate or butylbenzyl phthalate; from the adipates dioctyl adipate, diisodecyl adipate, furthermore diisodecyl succinate, dibutyl sebacate or butyl oleate. Among the polyether plasticizers, end-blocked polyethylene glycols are preferably employed, for example polyethylene- or polypropylene glycol di-$C_{1-4}$ alkyl ethers, particularly the dimethyl- or diethyl ethers of diethylene glycol or dipropylene glycol, as well as mixtures of two or more thereof. Similarly suitable exemplary plasticizers are esters of abietic acid, butyric acid esters, acetic acid esters, propionic acid esters, thiobutyric acid esters, citric acid esters, esters based on nitrocellulose and polyvinyl acetate, as well as mixtures of two or more thereof. The asymmetric esters of adipic acid monooctyl ester with 2-ethylhexanol (Edenol DOA, Cognis Deutschland GmbH, DOsseldorf) are also suitable, for example. Moreover, the pure or mixed ethers of monofunctional, linear or branched $C_{4-16}$ alcohols or mixtures of two or more different ethers of such alcohols, for example dioctyl ether (available as Cetiol OE, Cognis, Düsseldorf) are also suitable as plasticizers. Tricresyl phosphate, triphenyl phosphate, diphenylcresyl phosphate, diphenyloctyl phosphate, (2-ethylhexyl)-diphenyl phosphate, tris(2-ethylhexyl) phosphate and tris(2-butoxyethyl) phosphate are exemplary suitable esters from the group of the phosphoric acid esters. In addition to their function as a plasticizer, organic phosphoric acid esters also possess flame retardant properties, such that in the inventive compositions they act simultaneously as the component c) and as a plasticizer.

Likewise in the context of the present invention, suitable plasticizers are diurethanes that can be manufactured, for example, by treating diols having OH end groups with monofunctional isocyanates, the stoichiometry being chosen such that essentially all free OH groups react. Optionally, excess isocyanate can be subsequently removed from the reaction mixture by distillation, for example. A further method for manufacturing diurethanes consists in treating monohydric alcohols with diisocyanates, wherein all possible NCO groups react.

If the viscosity of the inventive composition is too high for certain applications then it can also be easily and conveniently reduced by the use of a reactive diluent without causing de-mixing phenomena (e.g. plasticizer migration) in the cured compound. The reactive diluent preferably possesses at least one functional group that after the application reacts for example with moisture or atmospheric oxygen. Examples of these groups are silyl groups. As reactive diluents, all compounds that are miscible with and reduce the viscosity of the inventive composition, and that carry at least one group that is reactive with the binder can be employed, alone or as a combination of a plurality of compounds.

The viscosity of the inventive composition can also be reduced by adding solvent in addition to, or instead of, a reactive diluent. Suitable solvents are aliphatic or aromatic hydrocarbons, halogenated hydrocarbons, alcohols, ketones, ethers, esters, ester alcohols, keto alcohols, keto esters and ether esters.

Moreover, the inventive curable composition can contain at least one catalyst as an additional component (silane condensation catalyst or curing or crosslinking catalyst). Exemplary suitable crosslinking catalysts for controlling the cure rate of the inventive compositions are organometallic compounds such as iron or tin compounds, in particular the 1,3-dicarbonyl compounds of iron such as e.g. iron(III)acetylacetonate or of divalent or tetravalent tin such as for example dibutyltin-bisacetylacetonate, the dialkyltin(IV) dicarboxylates—e.g. dibutyltin dilaurate, dibutyltin maleate or dibutyltin diacetate—or the corresponding dialkoxylates, e.g. dibutyltin dimethoxide. The organotin compounds are particularly well tried and tested and easily obtainable catalysts with excellent activity.

Boron halides such as boron trifluoride, boron trichloride, boron tribromide, boron triiodide or mixed boron halides can be employed as alternative cure catalysts. Boron trifluoride complexes, such as e.g. boron trifluoride diethyl etherate that are more easily handleable then the gaseous boron trihalides, are particularly preferred.

Furthermore, amines, nitrogen heterocycles and guanidine derivatives are generally suitable for the catalysis. A particularly preferred catalyst from this group is 1,8-diazabicyclo-[5.4.0]-undec-7-ene (DBU).

Moreover, titanium, aluminum and zirconium compounds or mixtures of one or more catalysts from one or more of the just mentioned groups are advantageously employed as the catalysts. On the one hand the addition of tin compounds can also be avoided in this manner; on the other hand a better adhesion to weakly adhering organic surfaces such as e.g. acrylates can be achieved. Among the titanium, aluminum and zirconium catalysts, the titanium catalysts are preferably employed, as they provide the best cure results.

Moreover, the inventive composition can comprise one or more adhesion promoters. An adhesion promoter is understood to mean a substance that improves the adhesion properties of adhesive layers on surfaces. Conventional adhesion promoters (tackifiers) that are known to the person skilled in the art can be employed individually or as a combination of a plurality of compounds. Suitable examples are resins, terpene oligomers, coumarone/indene resins, aliphatic, petrochemical resins and modified phenolic resins. In the context of the present invention, hydrocarbon resins, for example are suitable, such as those obtained by polymerizing terpenes, principally α or β-pinene, dipentene or limonene. Generally, these monomers are cationically polymerized by initiation with Friedel-Crafts catalysts. Copolymers of terpenes and other monomers, for example styrene, α-methyl styrene, isoprene and the like, are also counted among the terpene resins. The cited resins are used, for example, as adhesion promoters for pressure-sensitive adhesives and coating materials. The terpene-phenol resins, which are manufactured by acid catalyzed addition of phenols to terpenes or colophonium are also suitable. Terpene-phenol resins are soluble in most organic solvents and oils and are miscible with other resins, waxes and rubber. In the context of the present invention, the colophonium resins and their derivatives, for example their esters or alcohols, are likewise suitable in the above sense as adhesion promoters. Silane adhesion promoters, particularly amino silanes, are also very suitable.

In a special embodiment of the inventive curable composition, the composition includes a silane of the general Formula (III)

$$R^2R^3N-R^4-SiX^1Y^1Z^1 \qquad (III)$$

as an adhesion promoter, in which $R^2$ and $R^3$ independently of one another are hydrogen or $C_1$-$C_8$ alkyl groups, $R^4$ is a divalent C1-C12 hydrocarbon group that optionally contains a heteroatom, and $X^1$, $Y^1$, $Z^1$ independently of one other are $C_1$-$C_8$ alkyl, $C_1$-$C_8$ alkoxy or $C_1$-$C_8$ acyloxy groups, wherein at least one of the groups is a $C_1$-$C_8$ alkoxy or $C_1$-$C_8$ acyloxy group.

These types of compounds inherently possess a high affinity to the binding polymer components of the inventive curable composition, but also to a wide range of polar as well as non-polar surfaces and therefore contribute to the formation of a particularly stable adhesion between the adhesive composition and the respective substrates to be adhesively bonded. The group $R^4$ can be a straight chain or branched or cyclic, substituted or un-substituted alkenyl group, for example. Nitrogen (N) or oxygen (O) are optionally comprised therein as the heteroatom. When $X^1$, $Y^1$ and/or $Z^1$ are an acyloxy group, then this can be the acetoxy group —OCO—$CH_3$, for example.

Exemplary suitable fillers for the inventive composition are chalk, lime powder, precipitated and/or pyrogenic silicas, zeolites, bentonites, magnesium carbonate, diatomaceous earth, alumina, clay, talc, titanium oxide, iron oxide, zinc oxide, sand, quartz, flint, mica, glass powder and other ground mineral substances. Moreover, organic fillers can also be added, especially carbon black, graphite, wood fibers, wood flour, sawdust, cellulose, cotton, pulp, hogged chips, chopped straw, chaff, other chopped fibers and ground walnut shells. Furthermore, short fibers such as glass fiber, glass filament, polyacrylonitrile, carbon fiber, Kevlar fiber or also polyethylene fibers can also be added. Aluminum powder is also a suitable filler. Hollow spheres with a mineral sheath or a plastic sheath are also suitable fillers. These can be hollow glass microspheres, for example that are commercially available under the trade names Glass Bubbles®.

Hollow spheres based on plastic, e.g. Expancel® or Dualite® are described for example in EP 0 520 425 B1. These are composed of inorganic or organic substances, each with a diameter of 1 mm or less, preferably 500 µm or less. For some applications, fillers are preferred that lend thixotropy to the preparations. Such fillers are also described as rheological auxiliaries, e.g. hydrogenated castor oil, fatty acid amides or swellable plastics such as PVC. In order for them to be easily pressed out of a suitable metering device (e.g. tube), such preparations exhibit a viscosity of 3000 to 15 000, preferably 4000 to 8000 mPas or even 5000 to 6000 mPas.

The fillers are preferably added in an amount of 1 to 80 wt %, relative to the total weight of the composition. A single filler or a combination of a plurality of fillers can be used.

Furthermore, the inventive composition can comprise one or more antioxidants. The fraction of antioxidants in the inventive composition is preferably up to about 7 wt %, especially up to about 5 wt %, relative to the total weight of the composition. Moreover, the inventive composition can comprise UV stabilizers. The fraction of UV stabilizers in the inventive composition is preferably up to about 2 wt %, especially up to about 1 wt %. The hindered amine light stabilizers (HALS) are particularly suited as the UV stabilizers. One or more UV-stabilizers that carry a silyl group and which on crosslinking or curing is/are built into the final product, can also be added. The products Lowilite 75 and Lowilite 77 (Great Lakes, USA) are particularly suitable for this. Furthermore, benzotriazoles, benzophenones, benzoates, cyanoacrylates, acrylates and/or sterically hindered phenols can also be added.

It often makes sense to further stabilize the inventive compositions against the ingress of moisture so as to further increase the shelf life. An improvement of the shelf life of this kind can be achieved for example by adding drying agents. Suitable drying agents are all compounds that react with water to afford groups that are inert towards the reactive groups present in the composition and thereby causing the lowest possible changes in its molecular weight.

Advantageously added drying agents for example are vinyl silanes such as 3-vinylpropyl triethoxysilane, oximosilanes like methyl-O, O', O''-butane-2-one-trioximosilane or O, O', O'', O'''-butane-2-onetetraoximosilane (CAS Nr. 022984-54-9 and 034206-40-1 or benzamido silanes like bis(N-methylbenzamido)methyl ethoxysilane (CAS Nr. 16230-35-6) or carbamato silanes like carbamatomethyl trimethoxysilane. However, the use of methyl, ethyl or vinyltrimethoxysilane, tetramethyl or tetramethylethylethoxysilane is also possible. In regard to efficiency and costs, vinyltrimethoxysilane and tetraethoxysilane are particularly preferred here. The above-mentioned reactive diluents are also suitable as drying agents, in so far as their molecular weight ($M_n$) is less than about 5000 g/mol and they possess end groups, whose reactivity towards ingressed moisture is at least just as high, preferably higher, than the reactivity of the reactive groups of the inventive silyl group-carrying polymers. Finally, alkyl orthoformates or alkyl orthoacetates can be employed as the drying agent, for example methyl or ethyl orthoformate, methyl or ethyl orthoacetate. The inventive composition generally comprises about 0.01 to about 10 wt % drying agent.

The viscosity of the inventive curable composition is preferably less than 1 000 000 mPas (measured with a Brookfield viscosimeter type RVDVII+, spindle no. 7, 10 rpm at 23° C.). The viscosity of the inventive composition is particularly preferably less than 500 000 mPas. The viscosity of the inventive composition is in particular less than 250 000 mPas. These viscosities enable a good processability of the compositions.

A further subject matter of the present invention is the use of an inventive curable composition as an adhesive, sealant or coating material, in particular as an adhesive for adhesively bonding plastics, metals, glass, ceramics, wood, wood-based materials, paper, paper materials, rubber and textiles, as a sealant in the construction industry, in particular for grouting in the sanitary or kitchen areas, or as a coating material for coating substrates of large surface area.

The curable composition according to the invention preferably finds use for providing a substrate with a flame retardant, elastic coating. As a result of the very broad adhesion spectrum of the inventive curable composition, substrates of the most different material can be coated. The substrate is preferably foamed glass, as is commercially available for example under the name Foamglas®.

A further subject matter of the present invention is a coating, produced by depositing an inventive curable composition onto a coatable substrate, in particular onto foamed glass, and curing the composition.

Finally, a subject matter of the invention is also the use of at least one poly(dialkylsiloxane) b) for improving the fire performance of a curable composition that includes at least one organic polymer a), and preferably in addition at least one flame retardant additive c). With reference to the poly(dialkylsiloxanes) b), the organic polymers a) and the flame retardant additives c) and their preferred developments, the statements made above in the description of the inventive curable composition correspondingly apply.

In the present invention basically all the listed features in the present text, in particular the embodiments, tolerance intervals, ingredients and other features of the inventive composition and/or the inventive uses declared as preferred and/or special can be realized in all possible and not mutually exclusive combinations, wherein combinations of features declared as preferred and/or special are likewise considered as preferred and/or special.

In the following the invention is described in more detail with the help of exemplary embodiments, wherein the choice of the examples does not illustrate any limitation to the scope of the subject matters of the invention.

EXAMPLES

Unless stated otherwise, all parts and percentages refer to the weight.

Examples 1 and 2

The ingredients listed in Table 1 were blended together in a high-speed mixer under the exclusion of moisture. The resulting inventive curable compositions can be used as one-component adhesives, sealants and coating materials. However, they can also be used as the component A of an inventive two-component curable composition. In the latter case they are blended with a curing component B prior to the application. A suitable curing component B is set out in Example 3.

TABLE 1

|  | Example | |
|---|---|---|
|  | 1 | 2 |
| Organic polymer a)[1] | 14.00 | 14.00 |
| Poly(dialkylsiloxane) b)[2] | 15.00 | 14.00 |
| Al(OH)$_3$ | 53.95 | 52.95 |
| Diisoundecyl phthalate | 8.10 |  |
| Diisononyl phthalate |  | 10.11 |
| Color paste | 0.80 | 0.80 |
| Antioxidant | 1.40 | 1.40 |
| TiO$_2$ | 2.90 | 2.90 |
| Tinuvin 328[3] | 0.30 | 0.30 |
| Rilanit Spezial Micro W[4] | 1.00 | 1.00 |
| Viny trimethoxysilane | 1.50 | 1.50 |
| 3-Aminopropyl trimethoxysilane | 0.50 | 0.50 |
| Dynasylan 1146[5] | 0.50 | 0.50 |
| Dioctyl-bis(acetylacetonato)tin | 0.05 | 0.04 |
| Total | 100.00 | 100.00 |

[1] γ-Silane-terminated polypropylene glycol with trimethoxysilylpropyl carbamate end groups.
[2] Obtained by treating a hydroxyl-terminated polydimethylsiloxane (viscosity at 23° C. according to DIN 53018: 20 000 mPas, available from Wacker under the name Polymer FD 20) with vinyl trimethoxysilane in the presence of a LiOH/MeOH catalyst.
[3] UV-Absorber: 2-(2H-Benzotriazol-2-yl)-4,6-di-tert-pentylphenol.
[4] Rheology auxiliary: hydrogenated castor oil.
[5] Adhesion promoter: oligomeric diamino silane system, available from Degussa.

Example 3

A curing component B was manufactured by mixing the ingredients listed in Table 2:

TABLE 2

| Propoxylated glycerin (Acclaim 6300, Bayer) | 48.64 |
|---|---|
| Calcium carbonate | 38.00 |

TABLE 2-continued

| Monoethylene glycol, distilled | 3.00 |
|---|---|
| Methyl hydroxyethyl cellulose (Tylose MH, Shin-Etsu) | 0.36 |
| Water | 10.00 |
| Total | 100.00 |

Examples 4 to 5

10 parts of a composition according to Example 1 or 2 were each blended in a high-speed mixer with 1 part of the curing component B according to Example 3 and the resulting mixtures (Examples 4 or 5) were tested in regard to the adhesion behavior to various substrates, to significant parameters of the curing behavior, to the mechanical properties of the cured product and to the fire performance. The results are to be found in the following tables.

TABLE 3

Adhesion

|  | Example | |
|---|---|---|
|  | 4 | 5 |
| Storage: NK |  |  |
| Adhesion to anodized aluminum | 1 | 1 |
| Adhesion to hot-dip galvanized sheet steel | 1 | 1 |
| Adhesion to V2A 4301 | 1 | 1 |
| Adhesion to Alu 99.5 | 1 | 1 |
| Adhesion to raw steel | 1 | 1 |
| Adhesion to polyamide 66 | 1 | 1 |
| Adhesion to rigid PVC | 1 | 1 |
| Adhesion to fiber-glass reinforced epoxy resin | 1 | 1 |
| Storage: SW |  |  |
| Adhesion to anodized aluminum | 1 | 1 |
| Adhesion to hot-dip galvanized sheet steel | 1 | 4 |
| Adhesion to V2A 4301 | 1 | 1 |
| Adhesion to Alu 99.5 | 1 | 1 |
| Adhesion to raw steel | 1 | 4 |
| Adhesion to polyamide 66 | 1 | 1 |
| Adhesion to rigid PVC | 1 | 1 |
| Adhesion to fiber-glass reinforced epoxy resin | 4 | 4 |

Key to the Table:
NK: Storage for 7 days in standard conditions (50% relative humidity, 23° C.).
SW: Storage for 7 days in standard conditions (50% relative humidity, 23° C.) and then 7 days at 98% relative humidity and 40° C.
Adhesion: 1 = Adhesion OK, >95% cohesive break; 4 = Adhesion not OK, <25% cohesive break.

The results show that the inventive compositions reliably adhere to all tested substrates under standard conditions. Even after storage under very unfavorable environmental conditions the adhesion behavior towards many substrates is excellent. Under these conditions, adhesion problems were observed only with a few substrates known to be problematic, wherein the adhesion behavior of the inventive compositions to these substrates could also be positively influenced by the choice and quantity of plasticizers.

The tensile properties of the inventive compositions of Examples 4 and 5 are summarized in Table 4 below. For this the above cited mixtures were produced and processed into flat plaques with a layer thickness of 2 mm. After 7 days storage (23° C., 50% relative humidity) test specimens (S2-specimens) were punched out and the tensile data (E-modulus at 10, 25, 50 and 100% elongation, elongation at break and ultimate tensile strength) were determined according to DIN EN 27389 and DIN EN 28339.

TABLE 4

Curing behavior and tensile properties

| | Example | |
|---|---|---|
| | 4 | 5 |
| Pot life [min] | 11-13 | 12-14 |
| Shore A | 47 | 44 |
| Tensiles S2 test specimen | | |
| 10% Modulus N/mm$^2$ | 0.16 | 0.08 |
| 25% Modulus N/mm$^2$ | 0.47 | 0.30 |
| 50% Modulus N/mm$^2$ | 0.96 | 0.64 |
| 100% Modulus N/mm$^2$ | 1.80 | 1.25 |
| Ultimate Tensile Stress N/mm$^2$ | 2.52 | 2.15 |
| Elongation at Break % | 156 | 196 |

For the fire performance, inventive compositions according to the Examples 4 and 5 were coated in a layer thickness of 2 mm onto V2A plaques (20 cm×10 cm×3 mm). The coatings were cured for 7 days at 23° C. and 50% relative humidity. As a comparison, a corresponding test specimen was manufactured using a commercially available coating material (Terostat 939 FR). The resulting test specimens were flame treated with a blow torch (T>1100° C.) at a 90° angle for 60 seconds. After 60 seconds the blow torch was removed and the subsequent fire performance of the test specimen was observed. The results are presented in Table 5.

TABLE 5

Fire performance

| | Example | | |
|---|---|---|---|
| | 4 | 5 | Comparison |
| Flame persistence [s] | 10 | 13 | >60 |

The inventive composition showed a significantly better fire performance than the commercially available coating material. After removing the blow torch, all test specimens initially continued to burn with a yellow flame. Whereas the test specimen based on the inventive compositions self-extinguished after a short time, the comparative test specimen, however, continued to burn for more than one minute.

What is claimed is:

1. A curable composition, comprising
   a) at least one organic polymer, selected from polyethers and polyacrylic acid esters, wherein the organic polymer possesses at least one end group of the general Formula (I)

$$-A_n-R-SiXYZ \quad (I)$$

in which
   A stands for a divalent linking group, selected from the amide, carbamate, urea, imino, carboxylate, carbamoyl, amidino, carbonate, sulfonate and sulfinate group and from the oxygen atom and nitrogen atom,
   R is a divalent hydrocarbon group with 1 to 12 carbon atoms whose main hydrocarbon chain can optionally be interrupted by a hetero atom, and
   X, Y, Z independently of one other stand for $C_1$-$C_8$ alkyl, $C_1$-$C_8$ alkoxy or $C_1$-$C_8$ acyloxy groups, wherein at least one of the groups is a $C_1$-$C_8$ alkoxy or $C_1$-$C_8$ acyloxy group, and
   n is 0 or 1,
   b) at least one poly(dialkylsiloxane) with at least one end group of the general Formula (I')

$$-A'_n-R'-SiX'Y'Z' \quad (I'),$$ 

in which
   A' stands for a divalent linking group, selected from the amide, carbamate, urea, imino, carboxylate, carbamoyl, amidino, carbonate, sulfonate and sulfinate group and from the oxygen atom and nitrogen atom,
   R' is a direct bond or a divalent hydrocarbon group with 1 to 12 carbon atoms whose main hydrocarbon chain can optionally be interrupted by a hetero atom, and
   X', Y', Z' independently of one other are vinyl groups, $C_1$-$C_8$ alkoxy or $C_1$-$C_8$ acyloxy groups, wherein at least one of the groups is a vinyl group and at least one of the groups is a $C_1$-$C_8$ alkoxy or $C_1$-$C_8$ acyloxy group, and
   n' is 0 or 1, and
   c) at least one flame retardant additive, selected from red phosphorus, organic phosphorous compounds, ammonium polyphosphate, metal hydroxides, expandable graphite, zinc borate and melamine salts.

2. The curable composition according to claim 1, wherein the organic polymer possesses at least one end group of the general Formula (I), wherein R stands for a methylene or 1,3-propylene group.

3. The curable composition according claim 1, wherein the organic polymer possesses at least one end group of the general Formula (I), wherein X, Y and Z each independently of one another stand for methyl, ethyl, methoxy or ethoxy, with the proviso that at least two of the X, Y and Z groups stand for methoxy or ethoxy.

4. The curable composition according to claim 1, wherein the organic polymer is a polyether, selected from polyethylene glycols, polypropylene glycols and ethylene glycol-propylene glycol copolymers, or a polyacrylic acid $C_1$-$C_4$ alkyl ester.

5. The curable composition according to claim 1, wherein the poly(dialkylsiloxane) is a poly(dimethylsiloxane).

6. The curable composition according to claim 1, wherein the poly(dialkylsiloxane) possesses at least one end group of the general Formula (I'), wherein A' stands for —O— and R' stands for a direct bond.

7. The curable composition according to claim 1, wherein the poly(dialkylsiloxane) possesses at least one end group of the general Formula (I'), wherein X' stands for vinyl and Y' and Z' independently of one another stand for methoxy or ethoxy.

8. The curable composition according to claim 1, wherein the flame retardant additive is selected from aluminum hydroxide, magnesium hydroxide, expandable graphite and zinc borate.

9. The curable composition according to claim 8, wherein the flame retardant additive is aluminum hydroxide.

10. The curable composition according claim 1, wherein the weight ratio of the total amount of organic polymer a) to the total amount of poly(dialkylsiloxane) b) is 5:1 to 1:5, preferably 3:1 to 1:3, particularly preferably 2:1 to 1:2.

11. The curable composition according to claim 1, wherein the total amount of flame retardant additive c) is at least 10 wt %, preferably at least 25 wt %, particularly preferably at least 50 wt %, each relative to the total weight of the curable composition.

12. A coating, manufactured by depositing a curable composition according to claim 1 onto a substrate to be coated, and curing the composition.

13. A process for using at least one poly(dialkylsiloxane) with at least one end group of the general Formula (I')

$$-A'_n-R'-SiX'Y'Z' \quad (I'),$$ 

in which
- A' stands for a divalent linking group, selected from the amide, carbamate, urea, imino, carboxylate, carbamoyl, amidino, carbonate, sulfonate and sulfinate group and from the oxygen atom and nitrogen atom,
- R' is a direct bond or a divalent hydrocarbon group with 1 to 12 carbon atoms whose main hydrocarbon chain can optionally be interrupted by a hetero atom, and
- X', Y', Z' independently of one other are vinyl groups, $C_1$-$C_8$ alkoxy or $C_1$-$C_8$ acyloxy groups, wherein at least one of the groups is a vinyl group and at least one of the groups is a $C_1$-$C_8$ alkoxy or $C_1$-$C_8$ acyloxy group, and
- n' is 0 or 1,
- for improving the fire performance of a curable composition, containing at least one organic polymer, selected from polyethers and polyacrylic acid esters, wherein the organic polymer possesses at least one end group of the general Formula (I)

$$-A_n\text{-R—SiXYZ} \qquad (I)$$

in which
- A stands for a divalent linking group, selected from the amide, carbamate, urea, imino, carboxylate, carbamoyl, amidino, carbonate, sulfonate and sulfinate group and from the oxygen atom and nitrogen atom,
- R is a divalent hydrocarbon group with 1 to 12 carbon atoms whose main hydrocarbon chain can optionally be interrupted by a hetero atom, and
- X, Y, Z independently of one other stand for $C_1$-$C_8$ alkyl, $C_1$-$C_8$ alkoxy or $C_1$-$C_8$ acyloxy groups, wherein at least one of the groups is a $C_1$-$C_8$ alkoxy or $C_1$-$C_8$ acyloxy group, and
- n is 0 or 1, a step of which comprises
- (a) providing to the curable composition with mixing the at least one at least one poly(dialkylsiloxane) with at least one end group of the general Formula (I').

* * * * *